June 12, 1928.  1,672,946
A. KLELL
VALVE MECHANISM
Filed May 29, 1925
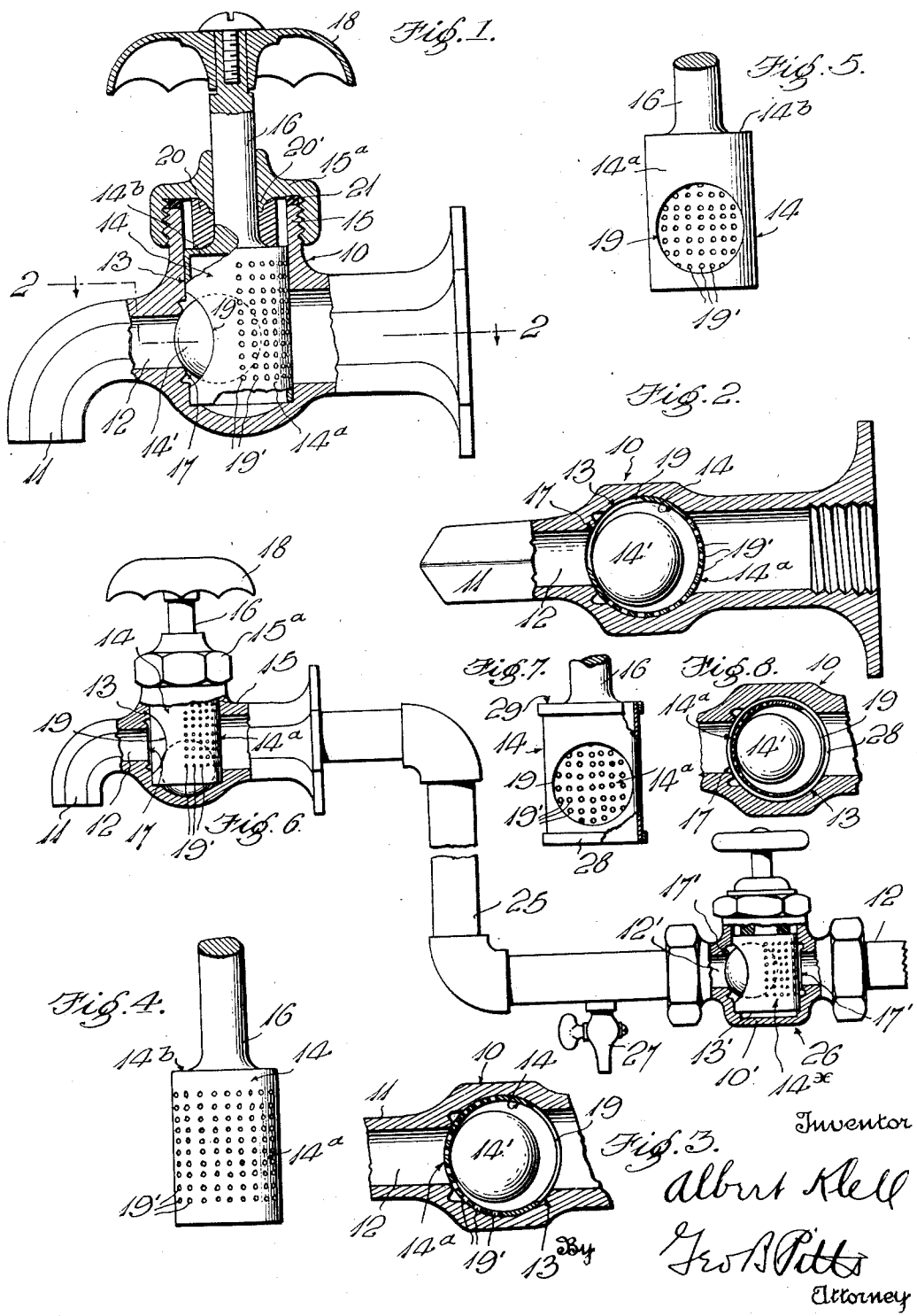

Patented June 12, 1928.

1,672,946

UNITED STATES PATENT OFFICE.

ALBERT KLELL, OF CLEVELAND, OHIO.

VALVE MECHANISM.

Application filed May 29, 1925. Serial No. 33,685.

The present invention relates to cut-outs or valves to control the flow of a fluid through a conduit and has for one object to provide a cut-out or valve in which the valve element is self closing due to the pressure of the fluid in the conduit.

Another object of the invention is to provide an improved valve mechanism, wherein compression elements, washers and other parts which wear rapidly or other elements requiring pressure to effect seating, are eliminated.

Another object of the invention is to provide a valve mechanism having a ball or other valve device upon which the pressure of the fluid in the pipe normally acts to maintain it in closed or seating position and improved means for displacing and releasing the ball or other device to control the flow of the fluid.

Another object of the invention is to provide a valve mechanism of this character which has manual means for displacing or unseating the valve element and for holding it from its seat for any desired length of time and which may be freed by a reverse operation of the manual means, whereby the fluid pressure in the pipe may act upon the valve element to seat it in closed position.

A further object of the invention is to provide an improved valve mechanism of simple construction and capable of ready assembly and dis-assembly.

The invention further aims at the provision of an operating member in the valve for unseating and freeing the ball or check valve, and which at the same time may be utilized as a strainer and which may be easily and quickly removed from the valve casing to permit access to the valve member itself.

Other objects of the invention will be apparent from the following description taken in connection with the accompanying drawings, wherein—

Figure 1 is a side elevation, partly in section, of a cut-out or valve mechanism constructed according to my invention, the valve element being shown in closed position.

Figure 2 is a horizontal section on the line 2—2 of Figure 1 but showing the valve element partly unseated.

Figure 3 is a fragmentary section showing the valve element completely unseated to permit the free flow of liquid through the valve casing.

Figure 4 is a detail rear side view of the member for controlling the valve element.

Figure 5 is a similar view showing the forward or open side of the member.

Figure 6 is a side elevation, partly in section of a pipe line equipped with valves constructed according to the present invention and arranged for draining the pipe line to prevent freezing and the like; one of the valves being slightly changed in construction to show a modified form of the invention.

Figure 7 is a fragmentary view, partly in elevation and partly in section, showing a slightly different form of construction.

Figure 8 is a fragmentary section through the valve casing and a shell of the form shown in Fig. 7.

Referring to the drawing, 10 designates a valve casing of any approved type, that shown for illustration being of the form generally used for domestic purposes, such as in sinks or other convenient places. 11 indicates a spout for the casing having an opening 12 therein for the passage of the liquid, the opening 12 extending backwardly through the body of the casing 10 as shown to advantage in Figures 1 and 2, whereby it may be connected with a supply pipe. The intermediate portion of the casing 10 is provided with a valve chamber 13 which is of cylindrical contour and extends transversely across the opening of passage 12, so that its walls at opposite sides thereof will serve as bearings for rotatably supporting a shell or cage member 14, the purpose of which is to control the seating and unseating of a valve element 14', as will be later described. In the preferred form of construction, the valve chamber is disposed vertically and extends upwardly through the casing and through an externally threaded boss or wall 15 upon which may be removably threaded a packing nut 15ª.

In the preferred form of construction, the chamber 13 terminates in the body portion of the casing 10, so that the walls of the latter closes the lower or inner end of the chamber. As the opening in the boss 15 has the same diameter as the shell or cage member 14, the latter may be removed therethrough in a simple manner as will be later set forth.

The inner end of the passage 12 leading from the valve chamber 13 remote from the source of supply for the fluid forms a seat 17, for the valve element 14', so that the pressure of the fluid acting upon or against the valve element will force it against its seat to stop the flow of the fluid, such as water or a gas, and thus automatically cuts it off, unless held from its seat (see Figs. 2 and 3) by the controlling member 14, as will later be set forth. The walls of the casing 10 are preferably cut away so as to provide an annular seat around the opening 12.

The shell or cage member 14 is preferably of sufficient length to extend down into and be seated at its inner end in the bottom of the valve chamber 13 and into that portion thereof at the opposite side of fluid opening or passage 12. The member 14 therefore has bearing in the valve casing 10 and may be turned or rotated to any desired degree therein.

The valve controlling member 14 may comprise a hollow, cylindrical wall 14$^a$ open at its inner end (that is, the lower end in the form and arrangement shown in the drawings) and connected with a shank or stem 16, which extends upwardly through the boss 15 and an opening in the nut 15$^a$ being equipped upon its upper end with a handle 18 of any approved type. By preference, the upper end of the wall 14$^a$ is closed by an end wall 14$^b$ to which the inner end of the stem 16 is connected. By preference, the walls 14$^a$ and 14$^b$ and stem 16 are formed integrally. At one side, the wall 14$^a$ is cut away to form a relatively large opening 19 through which the valve element 14' may project for engagement with its seat 17, when the member 14 is in one position (see Fig. 1). 19' indicates a plurality of perforations formed in the wall 14$^a$ throughout a relatively large area thereof so as to permit the free passage of the fluid at all times irrespective of the rotative or angular position of the member 14. As already indicated, the member 14 may be of cage like form and the openings or perforations 19' may be of any desired size but by preference they are relatively small so that they may function as a strainer for the fluid.

As shown, opening 19 in the member 14 is of sufficiently large diameter to permit the free seating of the valve element 14' against its seat 17, and the internal diameter of the member 14 is considerably larger than the external diameter of the valve element 14' to permit a limited movement of the latter and to prevent its closing the perforations 19' when the member 14 is moved to unseat the valve from its seat. The marginal edges of the opening 19 are preferably beveled or rounded to facilitate the movement of the member 14 between the valve and its seat and in order to lift the valve 14' therefrom.

20 indicates a compressible member, preferably a packing or gasket, formed of rubber or the like interposed between the end wall 14$^b$ and nut 15$^a$, and acted upon by the latter when screwed into position to yieldingly maintain the controlling member 14 in operative position with its lower end seated against the bottom wall of the casing 10. By preference, the lower inner wall of the packing 20 is flared or rounded to conform to a corresponding curvature which is given to the stem 16 at its connection with the wall 14$^b$, and the upper end of the gasket 20 is similarly formed at its inner wall to conform to a boss 20' or annular projection, which is formed upon the inner side of the packing nut 15$^a$ about the stem 16. These curved surfaces of the wall 14$^b$ and nut 15$^a$ are adapted to direct the packing 20 outwardly against the inner wall of the valve chamber 13 when the compression nut 15$^a$ is turned down upon its boss 15. This insures a tight sealing of the valve unseating member 14 in the casing. The valve element 14' preferably comprises a ball formed of suitable material, such as brass, copper or steel, whereby it may readily and properly engage its seat irrespective of any rotative position it may assume due to its unseating operation and flow of the fluid past it.

Pressure of the fluid in the pipe operates upon the valve 14' when the member 14 is in the position shown in Fig. 1, to maintain it against its seat 17 so as to close the valve. To open the valve the handle 18 is turned, which operation through the stem 16 rotates the valve unseating or controlling member 14 first into the position shown in Figure 2 to engage the marginal edge of the opening 19 between the valve 14' and its seat 17, lifting the valve from its seat to a greater or lesser extent dependent upon the extent of movement of the handle and permitting the fluid to pass freely through the opening 12 in the valve casing. The cylindrical valve unseating member 14 may be further turned into the position shown in Figure 3, so as to entirely remove the valve from its seat and permit it to bear against the inner side of the member 14 when the liquid is permitted to escape around the valve 14' and into the opening 12 of the spout 11. It is evident that to close the valve it is only necessary to again turn the handle 18 either reversely or in a continued direction of rotation to bring the opening 19 into register with the valve seat 17 when the fluid in the valve casing 10 will move the valve 14' against its seat and hold it securely in such closed position.

One advantageous application of the invention is shown in Figure 6, where is shown a pipe 25 which is adapted to be drained at times, so as to prevent the freezing and bursting of the pipe. In this installation the pipe 25 extends upwardly from a shut off valve 26 which may be of substantially the same construction as shown in Figure 1 or of any other desired construction. However, I have shown a slightly different form of construction which will be later described. Beyond the valve 26, and at the lowest point in the pipe line 25, preferably adjacent to the valve 26, is fitted a drain cock 27 and the upper end of the pipe 25 is provided with the valve mechanism as above described.

Ordinarily the valve 26 is left open and the valve element 14' is relied upon to shut off the flow of liquid from the pipe 25. When it is desired to drain the pipe 25 it is only necessary to shut off the valve 26 and open the pet cock 27. As pressure is relieved against the valve element 14' in the valve casing 10, the liquid is permitted to flow downwardly and out of the pet cock 27, the valve element 14' being relieved from its seat 17 and air being permitted to freely enter through the valve casing 10 and into the opening 12 and pipe 25. Complete automatic drainage is therefore insured by closing the valve 26 and opening the pet cock 27, without any manipulation of the handle 18. Likewise, upon opening of the valve 26 and closing of the cock 27, the fluid will fill the pipe 25 and act on the valve element 14' to seat it.

21 indicates a gasket interposed between the nut 15ª and the end wall of the boss 15 and serving to make the valve chamber 13 liquid tight when the valve element 14' and its controlling member 14 are assembled in position.

To remove these elements, for inspection and replacement purposes or to clean the strainer wall, all that is necessary is to remove the nut 15ª, whereupon the member 14 may be readily removed upwardly through the boss 15, and thereafter the valve element 14' may be removed.

Referring to the valve mechanism 26, 10' indicates a casing shaped for connection at any point in a pipe line. 12' indicates the fluid passage therethrough. 13' indicates the valve chamber. 17' indicates valve seats surrounding the passages 12' adjacent the walls of the chamber 13'. This form of construction permits the valve casing to be connected in the pipe without respect to the direction of flow of the fluid through the pipe, since there are two valve seats with either of which the valve element may engage when the member 14ˣ is properly positioned.

In Figs. 7 and 8 I have shown a slightly different form of construction wherein the cylindrical wall 14ª of the shell 14 is mounted in and connected to a ring 28 at its lower end, and at its upper end it is mounted in and connected to a ring 29, which is connected to the shank 16; the rings 28 and 29 rotatably fitting annular seats formed in the walls of the valve chamber 13.

In my construction of valve, the handle may be rotated to any desired extent to open or unseat the valve element a greater or lesser degree to control the flow of water, as desired; by rotating the handle substantially 180 degrees, the valve element may be completely unseated from the valve seat to permit maximum flow of the fluid.

My construction of valve mechanism is relatively simple in that there are no spring operated parts or other elements that must be operated to form a seal or complete closing of the valve by a compression movement, as in most valve mechanisms. Where the valve element is moved into engagement with its seat by screw threads force must be utilized to cause the seating. In my construction the seating and unseating of the valve element is effected by the rotation of a controlling member 14; and when rotated to one predetermined position the pressure or head of the fluid acts on the valve element to effect the seating thereof.

Furthermore in my construction I eliminate the use of washers or other elements which wear due to the seating and unseating of the valve; accordingly the construction is durable and efficient in cutting off or permitting flow of the fluid.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. A valve mechanism comprising a casing having a fluid opening therethrough and a rearwardly facing valve seat intermediately in the opening, a valve element mounted in the casing for normal engagement upon the seat by pressure of fluid in the opening in said casing, and means for unseating said valve element, said unseating means comprising a member rotatable in the casing and formed in its side wall with an opening larger in diameter than said valve, whereby the latter may project therethrough and engage its seat in one position of said member, and with separate openings of smaller diameter than said valve, whereby in another position of said member the valve is held away from its seat so that the fluid may pass through said member and fluid opening.

2. A valve mechanism comprising a casing having a fluid opening therethrough and a rearwardly facing valve seat intermediately in the opening, a ball valve in the casing adapted to be held to said seat by pressure of fluid in the fluid opening to close the same, and a manually operable valve unseating member carried in the casing for engagement between the valve and its seat to unseat said valve.

3. A valve mechanism comprising a casing having a through opening therein and a valve seat, a valve in the casing adapted to be normally seated against said seat by fluid pressure, and a rotatable member enclosing the valve and mounted in the casing and provided with an opening in one side through which the valve may project when said opening is brought into register with the valve seat.

4. A valve mechanism comprising a casing having a through opening therein and a rearwardly facing valve seat coaxial with the opening, a ball valve in the casing adapted to be held to said seat by fluid pressure in the casing, a rotatable member mounted in the casing and enclosing the valve and provided in one side with perforations through which the fluid may freely pass and having an enlarged opening at its other side adapted to register with said valve seat, said ball valve being adapted to project through the opening in said rotatable member to engage said seat and close the valve and said member being adapted to be turned for interpositioning its wall between the valve and its seat to open the valve.

5. A valve mechanism comprising a casing having a through opening therein and a rearwardly facing valve seat, a ball valve carried in the casing for engagement with said seat to close the valve, a cylindrical valve unseating member mounted for rotation in the casing rearwardly of said seat and to receive said ball valve when it is unseated, said valve unseating member having fluid openings in one side and having a relatively large opening in one side to register with said valve seat and permit projection of the valve through the member into engagement with the seat, and means for turning said valve unseating member to engage the marginal edge of said large opening between the valve and said valve seat to open the valve and permit free passage of fluid through the valve casing.

6. A valve mechanism comprising a casing having a through opening therein with an intersecting valve chamber and a rearwardly facing valve seat in said chamber coaxial with the through opening, a valve in said chamber, and a hollow valve unseating member enclosing said valve and having a large opening in one side to register with the valve seat and mounted to turn in said valve chamber, whereby one marginal edge of said opening may engage the valve to unseat it, said cylindrical member having perforations in it opposite side to permit free passage of fluid into and through the member at all times.

7. A valve mechanism comprising a casing having therein a through opening, a chamber intersecting said opening and a valve seat, and valve devices in said chamber comprising a ball valve and a cage member enclosing said ball valve and rotatably mounted in the chamber and through which the fluid may pass at all times, said member being formed at one side with an opening adapted to register with said valve seat to permit the ball valve to engage therewith due to pressure of the liquid against it.

8. A valve mechanism comprising a casing having therein a through opening and a chamber intersecting said opening, and a rearwardly facing valve seat, a ball valve in said chamber for engagment with said seat to close the opening, a cylindrical valve unseating member mounted for rotation in said chamber and enclosing said ball valve, said valve unseating member having fluid openings in one side forming a strainer and having a larger opening in its other side to register with said valve seat and admit projection of the valve through the member into engagement with the seat, and means for turning said valve unseating member to engage the marginal edge of said large opening with said valve to unseat it.

9. A valve mechanism comprising a casing having a through opening therein with an intersecting valve chamber and a rearwardly facing valve seat in said chamber coaxial with the through opening, a valve in said chamber, a hollow valve unseating member enclosing said valve and having a large opening in one side to register with the valve seat and mounted to turn in said valve chamber, whereby one marginal edge of said large opening may engage the valve to unseat it, a stem connected to said member and projecting upwardly through the casing, a nut engaging said casing, and a compressible member fitting about the stem and interposed between said nut and said member and acting to yieldingly hold the latter in position.

10. A valve mechanism comprising a casing having a chamber and fluid openings leading inwardly from its ends into said chamber, the inner ends of said openings forming valve seats, valve devices mounted in said chamber, one device comprising a member shaped to permit the fluid to flow through it and formed with an opening and the other device comprising a valve arranged to project through said opening for engagement with one of said seats, and means for rotating said member to cause the walls thereof to engage the valve and displace it.

In testimony whereof, I have hereunto subscribed my name.

ALBERT KLELL.